(12) United States Patent
Schmidt et al.

(10) Patent No.: US 7,661,090 B2
(45) Date of Patent: Feb. 9, 2010

(54) TASK GENERATION RUNTIME ENGINE

(75) Inventors: David Schmidt, Round Rock, TX (US); Timothy Abels, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 680 days.

(21) Appl. No.: 11/330,919

(22) Filed: Jan. 11, 2006

(65) Prior Publication Data

US 2007/0162899 A1    Jul. 12, 2007

(51) Int. Cl.
*G06F 9/44* (2006.01)
*G06F 9/45* (2006.01)

(52) U.S. Cl. .................. 717/106; 717/127; 717/151

(58) Field of Classification Search ......... 717/106–109, 717/126–131, 136, 150–152
See application file for complete search history.

(56) References Cited

U.S. PATENT DOCUMENTS

| | | | |
|---|---|---|---|
| 5,151,991 A * | 9/1992 | Iwasawa et al. ............. | 717/150 |
| 5,815,713 A * | 9/1998 | Sanders ...................... | 717/106 |
| 5,957,422 A * | 9/1999 | Shea ...................... | 248/220.31 |
| 6,118,447 A * | 9/2000 | Harel ......................... | 717/131 |
| 6,233,545 B1 | 5/2001 | Datig ............................ | 704/2 |
| 6,263,491 B1 * | 7/2001 | Hunt ......................... | 717/130 |
| 6,266,805 B1 * | 7/2001 | Nwana et al. ............... | 717/104 |
| 6,314,555 B1 * | 11/2001 | Ndumu et al. .............. | 717/101 |
| 6,336,139 B1 | 1/2002 | Feridun et al. ............. | 709/224 |
| 6,341,372 B1 | 1/2002 | Datig ........................... | 717/7 |
| 6,553,403 B1 | 4/2003 | Jarriel et al. ................ | 709/202 |
| 6,691,250 B1 | 2/2004 | Chandiramani et al. ....... | 714/25 |
| 6,721,943 B2 * | 4/2004 | Krishnaiyer et al. ........ | 717/150 |
| 6,778,971 B1 * | 8/2004 | Altschuler et al. ............ | 706/55 |
| 6,817,010 B2 * | 11/2004 | Aizenbud-Reshef et al. | 717/127 |
| 6,857,120 B1 * | 2/2005 | Arnold et al. ............... | 717/157 |
| 6,862,553 B2 | 3/2005 | Schwenke et al. .......... | 702/183 |
| 6,970,985 B2 * | 11/2005 | Moritz ...................... | 711/154 |
| 7,017,116 B2 * | 3/2006 | Elsbree et al. .............. | 715/740 |
| 7,035,809 B2 * | 4/2006 | Miller et al. .................... | 705/8 |
| 7,219,329 B2 * | 5/2007 | Meijer et al. ................ | 717/106 |
| 7,278,137 B1 * | 10/2007 | Fuhler et al. ................ | 717/153 |
| 7,386,842 B2 * | 6/2008 | Eichenberger et al. ...... | 717/150 |
| 7,426,723 B1 * | 9/2008 | Nikolov ...................... | 717/151 |
| 7,428,727 B2 * | 9/2008 | Alverson et al. ............ | 717/134 |

(Continued)

OTHER PUBLICATIONS

Mallik et al, "Auromated task distribution in multicore network processors using statistical analysis", ACM ANCS, pp. 67-76, 2007.*

(Continued)

*Primary Examiner*—Anil Khatri
(74) *Attorney, Agent, or Firm*—Hamilton & Terrile, LLP; Gary W. Hamilton

(57) ABSTRACT

A system and method for automating the generation and execution of sequences of manual operations, using a structured process and grammar, suitable for implementation in systems integration. The method of the invention allows manual operations to be defined by local or remote subject matter experts (SMEs), using a Manual Operations Grammar, with the system allowing the definition of methods for validating measurements, reporting, and optimizing a set of one or more operations and/or processes. As part of the system, generated scripts can automate a plurality of manual tasks, operation and/or process steps, and a plurality of automated tasks, operation and/or process steps.

16 Claims, 3 Drawing Sheets

U.S. PATENT DOCUMENTS

| | | | |
|---|---|---|---|
| 7,478,380 B2 * | 1/2009 | Schmidt et al. | 717/162 |
| 7,594,223 B2 * | 9/2009 | Hank et al. | 717/151 |
| 2006/0069761 A1 | 3/2006 | Singh et al. | 709/222 |

OTHER PUBLICATIONS

Kwok et al, "Statis scheduling algorithm for allocating direcetd task graphss to multiprocessors" ACM computing surveys, vol. 31, No. 4, pp. 406-471, 1999.*

Benini et al, "System level power optimization: Techniques and tools", ACM Trans. on Design of Electronic Systems, vol. 4, No. 2, pp. 115-192, 2000.*

Atienza et al, "Optimization of dynamic data structures in multimedia embaded systems using evolutionary computation", ACM Scope, pp. 31-40, 2007.*

* cited by examiner

TASK GENERATION RUNTIME ENGINE

BACKGROUND OF THE INVENTION

1. Field of the Invention

The present invention relates in general to the field of information handling systems, and more specifically, to a system and method for the automated generation and execution of scripts for the management of manual tasks, operations or processes.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is processed, stored or communicated, and how quickly and efficiently the information may be processed, stored, or communicated. The variations in information handling systems allow for information handling systems to be general or configured for a specific user or specific use such as financial transaction processing, airline reservation, enterprise data storage, or global communications. In addition, information handling systems may include a variety of hardware and software components that may be configured to process, store, and communicate information, and may include one or more computer systems, data storage systems, and networking systems.

The ongoing management of these systems can become problematic as they proliferate in number and the business operations they are used in become more complex. Exacerbating the situation is the fact that not all operations and/or processes can be completely automated and may require one or more manual actions by a human operator. Some of these operators may possess less than optimal qualifications and/or speak different languages, further complicating the situation. While there are some standardized languages for process management, there is no common grammar between automated and manual operations and/or processes. For example, Business Process Execution Language (BPEL), Orchestration, and similar automation approaches have neither a grammar for manual steps, nor formalized hooks between manual steps and automated steps.

Currently, no system or method exists for the-automated generation and execution of scripts that implement a formalized grammar capable of driving manual tasks, operations or processes such as integrating, validating, measuring, auditing, or optimizing with automated steps, remote access, or reusable scripts. In view of the foregoing, there is a need for a system and method for automating the generation and execution of grammar-based scripts that can be implemented to optimize manual tasks, operations or processes. In particular, there is a need for a system and method that can implement such scripts based on known cost-reduction capabilities, quality metrics, task localities, completion times, and/or policies, coupled with the ability to leverage remote expertise, such as subject matter experts.

SUMMARY OF THE INVENTION

In accordance with the present invention, a system and method is disclosed for a run-time engine and/or environment that automates the generation and execution of grammar-driven scripts that can be implemented to optimize manual tasks, operations or processes. The present invention makes it possible to reduce the staffing required to perform manual tasks, operations, and/or processes in information technology (IT) operations, data centers, or other operations that require one or more manual actions by human operators.

In the present invention, a runtime engine implements a process management protocol that is based on grammar, such as that used in the flexible construct of a sentence. The Manual Operations Grammar, described in more detail hereinbelow, allows local or remote Subject Matter Experts (SMEs) to formalize manual steps for a task, process and/or operation, in an unambiguous, reusable, and auditable manner. The run-time engine optimizes the formalized sequence of steps, allowing manual tasks, processes or operations to be combined. These manual tasks, processes or operations can then be performed in blocks, which can lead to more efficient utilization of human operators. For example, optimization choices may be driven by predetermined parameters such as references to physical resources (e.g., current version of CD, processor, peripheral, etc.), time (e.g., three, five minute tasks may be combined into a contiguous task block), recurrence intervals (e.g., daily, weekly, etc.), priority level (e.g., urgent, low priority, etc.).

The runtime library of the present invention defines scripts for manual tasks, processes and operations in conjunction with automated processes and operations. Operation sequences are defined using scripts from the library. Scripts result in a sequence of manual and/or automated operations through the use of late binding, as known to those of skill in the art, to allow implementation of current versions of physicals (e.g., current systems), validations, best practices, and policies in a systems integration or operational environment. In particular, various embodiments of the present invention may comprise libraries of scripts for service, repair, operations, etc., that can be implemented using various business process orchestration languages. Furthermore, the present invention makes it possible to integrate these tasks, processes and/or operations for the tracking and reporting of both manual and automated metrics, estimated time versus defined time-per-tasks, sign-off auditing, logging of failures, warnings and events, etc.

In one embodiment of the invention, the runtime engine generates and then executes a script that has a local break-fix staff at a remote SME lab install boot CDs in a plurality of information handling systems (e.g., servers), then remotely and automatically continue the validation and set-up of each system. In various embodiments of the invention, many associated elements of the method are "grammar driven," including the integration between manual and automated tasks, processes and/or operations. These tasks, processes and/or operations can include security access levels, audit sign-off, reporting of time stamps, audits, and success/failure events, as well as task dependencies potentially affecting allowable optimizations.

Those of skill in the art will understand that many such embodiments and variations of the invention are possible including, but not limited to, those described hereinabove.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
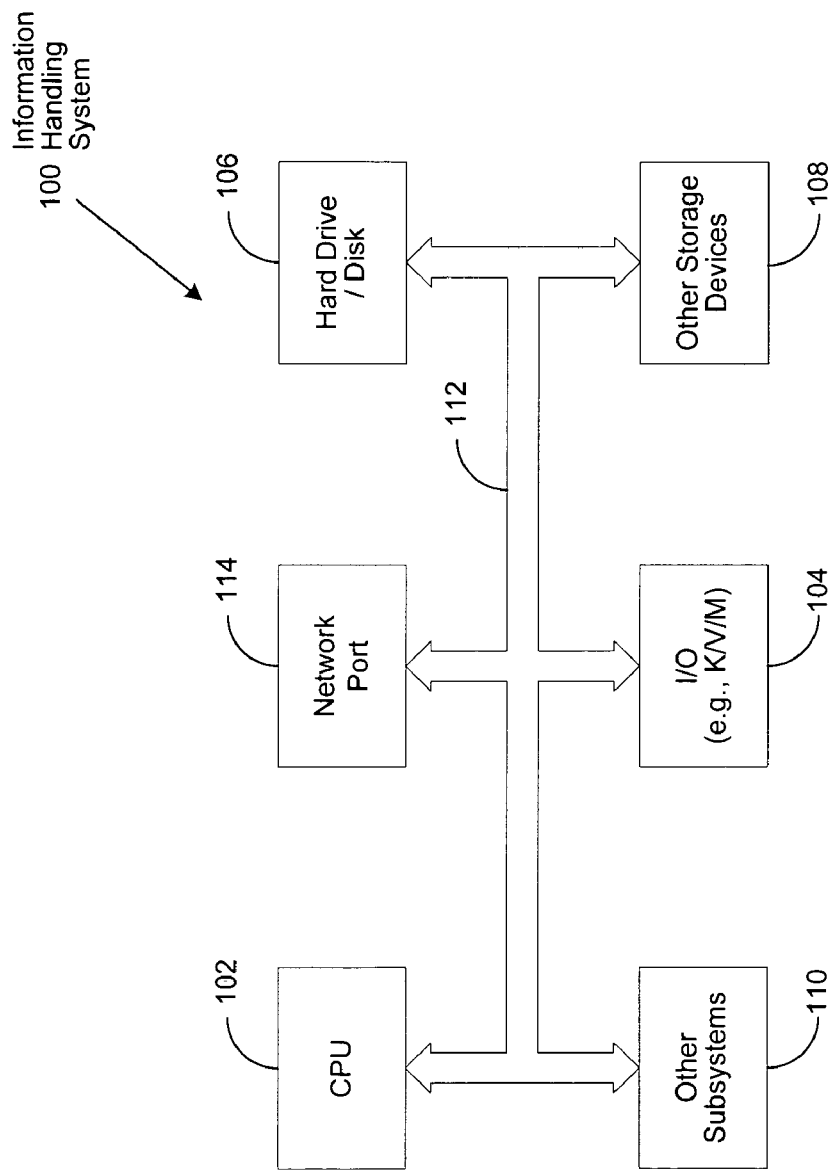
FIG. 1 is a generalized illustration of an information handling system that can be used to implement the system and method of the present invention.

FIG. 1 is a generalized illustration of an information handling system 100 that can be used to implement the method and apparatus of the present invention. The information handling system includes a processor 102, input/output (I/O) devices 104, such as a display, a keyboard, a mouse, and associated controllers, a hard disk drive 106, other storage devices 108, such as a floppy disk and drive and other memory devices, various other subsystems 110, and network port 114, all interconnected via one or more buses 112.

For purposes of this disclosure, an information handling system may include any instrumentality or aggregate of instrumentalities operable to compute, classify, process, transmit, receive, retrieve, originate, store, display, manifest, detect, record, reproduce, handle, or utilize any form of information, intelligence or data for business, scientific, control or other purposes. For example an information handling system may be a personal computer, a network storage device, or any other suitable device and may vary in size, shape performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As was discussed above, the ongoing management of these systems can become problematic as they proliferate in number and the business operations they are used in become more complex. In particular, the management of information handling systems in some environments is complicated by the fact that there is no common grammar for use in process management languages to integrate automated and manual operations and/or processes.

The present invention provides a method and system wherein a task generation runtime engine or environment can automate the generation of scripts that implement a grammar-based management process based on the flexible construct of a sentence. Those of skill in the art will recognize that sentences are flexible because language recognizes cohesion. For example, there may be no obvious similarity or function between elements of a sentence, yet they can be interchangeably combined, based on rules of grammar. The Manual Operations Grammar, described in more detail hereinbelow, allows local or remote Subject Matter Experts (SMEs) to use grammar to formalize manual steps for a task, process or operation and to integrate these steps with automated processes and/or operations. These manual and/or automated tasks, processes and/or operations can include security access levels, audit sign-off, reporting of time stamps, audits, and success/failure events, as well as task dependencies potentially affecting allowable optimizations.

Figure 2:
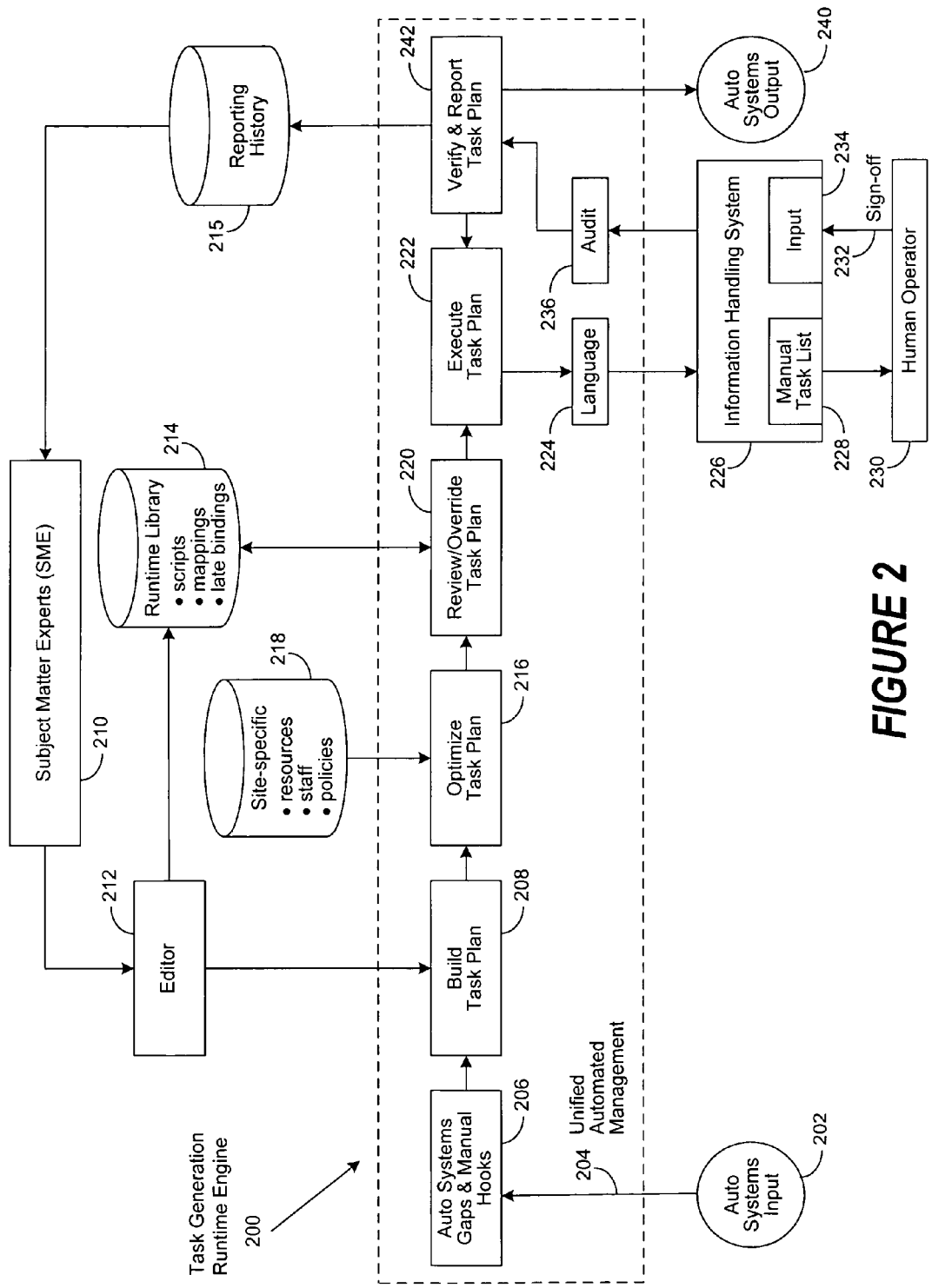
FIG. 2 is a flowchart illustrating a task generation runtime engine automating the generation of grammar-based management scripts as implemented in accordance with one embodiment of the present invention.

FIG. 2 is a flowchart illustration of an implementation of task generation runtime engine 200 as used to build and execute grammar-based management scripts in an integrated manual and automated operations control system in accordance with one embodiment of the present invention. The various process steps and functional modules can be implemented using one or more information handling systems using techniques understood by those of skill in the art. In this embodiment, the task generation runtime engine 200 of the invention implements a process and associated grammar to generate a script that can control a sequence of manual and automated operations. Manual operations are defined using an operation grammar, and the process defines methods for validating, measuring, reporting, and optimizing a set of operations.

In one implementation of this embodiment of the invention, automated tasks, operations, and/or processes, representing a unified and automated management system, are entered by an auto systems input 202 that can be implemented through the use of an information handling system. In various embodiments of the invention, these same automated tasks, operations, and/or processes, can be represented by high-level scripts.

In step 206, predetermined gaps in the automated management system are identified, and hooks for manual operations are established and defined by task generation runtime engine 200. In step 208, a task plan is built by task generation runtime engine 200, by merging and/or integrating a plurality of automated scripts, mappings and/or late bindings from library 214 and/or other automated tasks with a plurality of manual scripts and/or tasks. In one embodiment of the invention, a human operator can perform the actions in this step.

In various embodiments of the invention, a local or remote human operator such as a subject matter expert (SME) using the SME information handling system 210, can access the runtime engine, which is coupled to runtime library 214 containing scripts for both automated and manual operations, as well as mapping and late binding information which can be used in conjunction with an editor 212 to perform these same steps. The resulting script becomes a sequence of automated and manual tasks with late binding, which allows linking to, and/or invocation of, current versions of validations, best practices, and policies. Once the automated script portions of the task plan have been verified, manual tasks can be added, which can then be verified for proper operation.

Upon verification, the resulting script can be subdivided into tasks and runtime hooks for manual operations can be added. In various embodiments of the invention, metadata tags may be added to the scripts including, but not limited to, dependency tasks (e.g., for optimization passes on task grammar), estimated time to complete, and predetermined skill required (e.g., for who and sign-off). In addition, metadata tags may be added for launch schedule (e.g., time, recurrence frequency such as daily, weekly, etc., or launch event), and priority levels (e.g., urgent problem management, cost-benefit change management, low priority maintenance, etc.). Upon completion and successful validation, the resulting script can be added to runtime library 214.

In Step 216, the task plan is optimized by an optimizer module. In one embodiment of the invention, a hybrid dependency graph is generated, providing a topological sort of all fixed dependencies between tasks. In other embodiments of the invention, large-scale automated management systems may require a pre-pass at script-level, followed by task-levels within scripts. Optimization passes are then based on an optimal match based on fixed criteria (e.g., physicals, regulations, staff skills, max staffing) and/or weighted policies (cost, staff, off-peak, time).

In one embodiment of the invention, the optimizer module comprises a dependency engine that is operable to optimize the sequence of operations, allowing manual operations to be combined when feasible. These manual operations can then be performed in large blocks, thereby optimizing the use of human operators performing manual operations. As an example, optimization choices can include references to physical resources, time (e.g., three 5-minute tasks combined to create a worthwhile task block), recurrence level (e.g., daily, weekly, etc.), and priority level.

In step 220, the task plan can be reviewed by displaying scripts, mappings, binding info, etc., and if required, manually overridden for out-of-band errors, advanced knowledge of the execution environment, or other possible error situations. Those of skill in the art will appreciate that automated or manual matches to existing manual scripts can allow skipping some or all of the steps and sub-steps comprising step 208 and step 216, but late binding steps as described in step 220 cannot be omitted. In step 222, the task plan is executed by task generation runtime engine 200 by queuing the highest-priority, non-blockable task list, which is defined as a trade-off between automated and manual operations. In step 224, the tasks are personalized (e.g., skill, language, localization, etc.) before they are presented as a manual task list 228 on the display of an information handling system 226 used by a human operator 230.

The human operator 230 then executes the tasks, operations and/or processes listed in the manual task list 228 and sign-off information 232 is entered as input 234 to an information handling system 226. The entered sign-off information 232 is audited in step 236 before being verified in step 242. In step 242, the verified and reported task plan can be presented for re-execution in step 222, presented as automated system output to an information handling system (e.g., as input to another system) 240, or stored as reported history 215, which can be presented and/or reviewed by a local or remote SME using an SME information handling system 210. As an example, reporting can include but is not limited to, the tracking of manual and automation metrics, estimated time versus defined time-per-tasks, sign off auditing, as well as failure, warning, and message logs.

Figure 3:
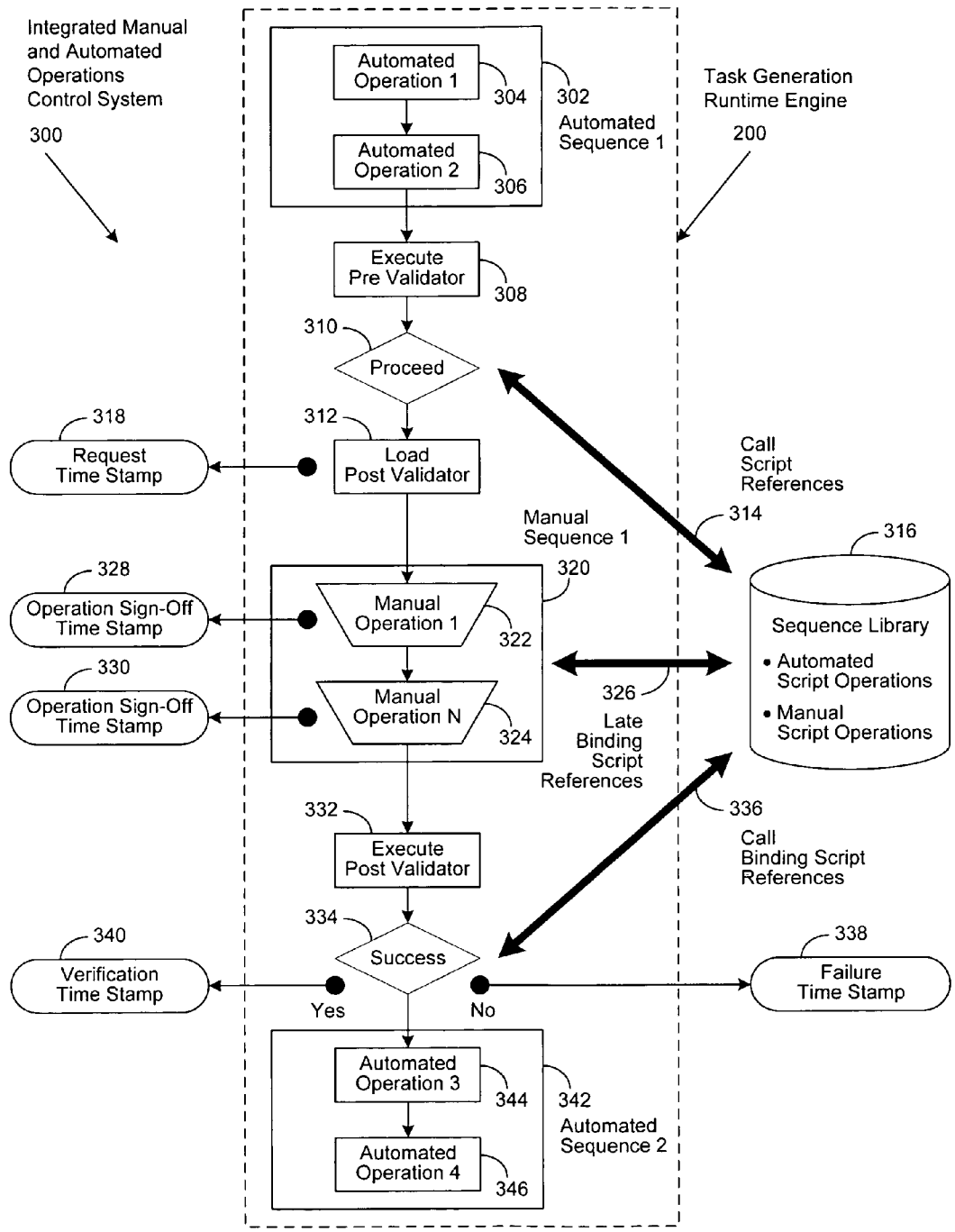
FIG. 3 is a flowchart illustrating an integrated manual and automated operations control system executing grammar-based management scripts through the implementation of a task generation runtime engine in accordance with another embodiment of the present invention.

FIG. 3 is a flowchart illustration of another implementation of an integrated manual and automated operations control system 300 executing grammar-based management scripts through the implementation of task generation runtime engine 200 in accordance with one embodiment of the present invention. In this embodiment of the invention, a first sequence of automated operations 302, comprised of a first automated operation 304 and a second automated operation 306, is initiated by task generation runtime engine 200. In step 308, a pre-validator process of the runtime engine is executed, which in step 310, calls script references 314, which reside in sequence library 316. After script references 314 are called from sequence library 316 as required, they are validated and loaded in step 312 by the runtime engine. Upon validation and loading, a time stamp may be requested and generated by the operations control system in step 316.

Next, a first sequence of manual operations 320, comprised of a first manual operation 322, through N number of manual operations 306, is initiated by the task generation runtime engine 200, in accordance with scripts previously retrieved from sequence library 316. As will be apparent to those of skill in the art, the root Manual Operations Grammar unit called by an operations control system or subject matter expert (SME), is in the form of a script, implementing syntax as illustrated in the samples hereinbelow.

Sample 1:

```
//Script - root integration with automated systems of SME Library
   invocations
script : preload_auto_validation control_statements script_library
        auto_validation_callback
preload_auto_validation : //see callback syntax (such as Python's) for
        registering callback handlers
auto_validation_callback : //invoke callback to auto. Callback types
        include transactional,
//connection, exception, event-specific or no-op for synchronous
```

Sample 2:

```
//metadata info for maintaining script in Library
script_library : library version signoff_level launch_frequency
        est_completion_time
version : major_num '.' Minor_num '.' Build_num
launch_frequency : one
one_time_launch : once | daily | weekly
est_completion_time : hours_num | minutes_num | seconds_num
signoff_level: tech | lab_engineer | sr_lab_engineer //or specific skills
priority_level: high | medium | low | num
```

Sample 3:

```
//Control statements of manual tasks
control_statements : FOR expression DO control_statements ENDFOR
| WHILE expression DO control_statements ENDWHILE
| IF expression THEN control_Statements ELSE control_statements
ENDIF
| optional_who manual_task_list optional_signoff
espression: //Boolean values and operators
manual_task_list : manual_task_list manual_task
| //empty
manual_task : io_task io_object
| system_task optional_system_context_system_object u_location
| connect_task connect_object connection_length
| // empty
```

Sample 4:

```
//Data center sample of manual tasks, could extend for IT desktop, FRU
   support, etc.
optional_who : names | roles | // empty if default
optional_signoff : password | map_to_password | // empty if default
io_task : PUT | LABEL | RETURN
io_object : tape | usb | cd | dvd
system_task : BUILD | TEARDOWN | REBOOT | SHUTDOWN
optional_system_context : rack '.' chassis '.' | rack '.' |
        chassis '.' | // empty if default
system_object : server | storage | ups | switch | router
connect_task : PLUG | UNPLUG
connect_object : cable | power | cooling
connect_num : num //cable, power, or cooling number
connection_length : num
cable : ETHERNET | FAST_ETHERNET _ GIG_ETHERNET |
        FIBER_CHANNEL | FAST_FIBER_CHANNEL | INFINIBAND |
        slot_num port_num | BOARD port_num
power : POWERSUPPLY
cooling : FAN
u_location : unum '-' u_num | u_num // iff 1U
tape : TAPE num
usb : USB num
```

-continued

```
cd : CD num | CD_VariableName //late binding name like
    WIN2003EE_CURRENT_CD
dvd : DVD num
rack : RACK num
chassis : CHASSIS num
U_num : num //1 to 42 only
Num : [0123456789]+
```

Prior to execution of the first manual sequence 320, late binding script references 326, which allow linking to and/or invocation of, current versions of physicals (e.g., current CD version), validations, best practices, and policies, are accessed from sequence library 316. Concurrently, the operations control system of the runtime engine may request a time stamp 328, 330 whenever a late binding script reference is associated with each manual operation 322, 324 of the first manual sequence 320. In step 332, the post validator process is executed by task generation runtime engine 200 to check the validity of the scripts comprising the first manual sequence 320.

If, in step 334, validity checks are verified to be successful, a verification time stamp may be generated in step 340, before task generation runtime engine 200 proceeds to the second automated sequence 342, comprised of a third automated operation 344 and a fourth automated operation 346. If, in step 334, validity checks fail, and are verified to not be successful, binding script references can be called 336 from sequence library 316 and associated with a failure time stamp 338, before task generation runtime engine 200 proceeds to the second automated sequence 342, comprised of a third automated operation 344 and a fourth automated operation 346.

Those of skill in the art will realize that various embodiments of the invention are not limited to the automated generation, integration, and optimization of grammar-based scripts for managing automated and manual tasks, processes and operations, the sample grammar as illustrated hereinabove, or maintenance of information handling systems. Furthermore, the grammar-driven integration described herein can enable manual tasks, processes and/or operations for IT desktops, field ready units, service installations (e.g., phone, cable), or any series of tasks, operations and/or processes that may include the management of manual actions by human operators. Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

As described herein, the various embodiments of the present invention provide a method and system wherein a runtime engine or environment implements a grammar-based process management protocol to generate scripts that can reduce the staffing required to perform manual tasks, operations, and/or processes in information technology (IT) operations, data centers, or other operations environments that use information handling systems requiring one or more manual actions by human operators. Furthermore, human operator staff may not require as much skill, or a common native language when using an implementation of various embodiments of the invention. In addition, implementation of the invention can enable cost reductions that include staffing, training, automated reporting, service times, mean time to recovery (MTTR), and off-peak utilization. Similarly, use of the invention can facilitate quality improvements that include removing ambiguity, task-based sign-off, improved error rates, auditability, complete reporting, shortened service times, enhanced safety, and mean time to recover (MTTR).

Although the present invention has been described in detail, it should be understood that various changes, substitutions and alterations can be made hereto without departing from the spirit and scope of the invention as defined by the appended claims.

What is claimed is:

1. A runtime engine operable to automatically generate a sequence of instructions, comprising:
  a process management protocol comprising an operation grammar for a non-automated task comprising a manual operation;
  a systems input module operable to receive an automated task and said non-automated task;
  a task plan build module operable to use said process management protocol to generate a task plan from said automated task and said non-automated task;
  an optimization module operable to optimize said task plan, wherein said optimization module uses said operation grammar to perform said optimization; and
  an execution module operable to execute said task plan; wherein said systems input module further comprises execution logic operable to identify a gap in a plurality of said automated tasks corresponding to a said non-automated task; and generate runtime hooks corresponding to said non-automated task in said task plan, wherein said runtime hooks are used for execution of said non-automated task in said task plan; and wherein said task plan build module is operable to integrate said manual tasks with said automated tasks to generate a task plan comprising a script of automated and manual tasks.

2. The runtime engine of claim 1, wherein said optimization module modifies said task plan based on information generated by a hybrid dependency engine.

3. The runtime engine of claim 2, wherein said hybrid dependency engine performs a topological sort of fixed dependencies between tasks in said task plan.

4. The runtime engine of claim 3, further comprising data processing modules operable to generate a manual task list from said task plan.

5. The runtime engine of claim 4, further comprising a language module operable to generate said task list in a predetermined language.

6. The runtime engine of claim 5, further comprising an audit module operable to generate verification information relating to execution of said manual tasks.

7. The runtime engine of claim 6, further comprising a task plan review and override module operable to modify said task plan based on information generated by a subject matter expert.

8. The runtime engine of claim 7, wherein said review and override module receives information for modifying said task plan from a library module comprising a plurality of scripts corresponding to tasks in said task plan.

9. A method for using an information handling system to automatically generate a sequence of instructions, comprising:
  using a process management protocol comprising an operation grammar for a non-automated task comprising a manual operation;

using a systems input module operable to receive an automated task and said non-automated task;

using a task plan build module operable to use said process management protocol to generate a task plan from said automated task and said non-automated task;

using an optimization module operable to optimize said task plan, wherein said optimization module uses said operation grammar to perform said optimization; and using an execution module operable to execute said task plan; wherein said systems input module further comprises execution logic operable to identify a gap in a plurality of said automated tasks corresponding to a said non-automated task; and generate runtime hooks corresponding to said non-automated task in said task plan, wherein said runtime hooks are used for execution of said non-automated task in said task plan; and wherein said task plan build module is operable to integrate said manual tasks with said automated tasks to generate a task plan comprising a script of automated and manual tasks.

10. The method of claim 9, further comprising using said optimization module to modify said task plan based on information generated by a hybrid dependency engine.

11. The method of claim 10, wherein said hybrid dependency engine performs a topological sort of fixed dependencies between tasks in said task plan.

12. The method of claim 11, wherein said information handling system comprises data processing modules operable to generate a manual task list from said task plan.

13. The method of claim 12, wherein said information handling system further comprises a language module operable to generate said task list in a predetermined language.

14. The method of claim 13, wherein said information handling system further comprises an audit module operable to generate verification information relating to execution of said manual tasks.

15. The method of claim 14, wherein said information handling system further comprises a task plan review and override module operable to modify said task plan based on information generated by a subject matter expert.

16. The method of claim 15, wherein said review and override module receives information for modifying said task plan from a library module comprising a plurality of scripts corresponding to tasks in said task plan.

* * * * *